(12) United States Patent
Jung et al.

(10) Patent No.: US 8,549,471 B2
(45) Date of Patent: Oct. 1, 2013

(54) METHOD AND APPARATUS FOR PROVIDING API SERVICE AND MAKING API MASH-UP, AND COMPUTER READABLE RECORDING MEDIUM THEREOF

(75) Inventors: Dong-shin Jung, Suwon-si (KR); Joo-yeol Lee, Seoul (KR); Joe Antony Lawrence, Karnataka (IN); Raghavendra Malapati, Karnataka (IN); Subramanian K., Karnataka (IN); Vinoth Sasidharan, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1048 days.

(21) Appl. No.: 12/209,582

(22) Filed: Sep. 12, 2008

(65) Prior Publication Data
US 2009/0158238 A1   Jun. 18, 2009

(30) Foreign Application Priority Data
Dec. 14, 2007 (KR) ........................ 10-2007-0131081

(51) Int. Cl.
*G06F 9/44* (2006.01)

(52) U.S. Cl.
USPC ........... 717/106; 717/107; 717/170; 719/328; 710/1

(58) Field of Classification Search
None
See application file for complete search history.

(56) References Cited

U.S. PATENT DOCUMENTS

| | | | | |
|---|---|---|---|---|
| 5,999,948 A * | 12/1999 | Nelson et al. | ................. | 715/207 |
| 6,038,611 A * | 3/2000 | Masel | ........................... | 719/328 |
| 6,070,175 A * | 5/2000 | Mezei | ........................... | 715/205 |
| 7,043,481 B2 * | 5/2006 | Mullins et al. | ........................ | 1/1 |
| 7,805,735 B2 * | 9/2010 | Shenfield et al. | ............. | 719/328 |
| 8,037,157 B2 * | 10/2011 | Xiao et al. | ..................... | 709/218 |
| 8,069,435 B1 * | 11/2011 | Lai | ................................ | 717/106 |
| 8,126,770 B2 * | 2/2012 | Lim | ................................ | 705/16 |
| 2003/0110315 A1 * | 6/2003 | Upton | ........................... | 709/328 |
| 2004/0237064 A1 * | 11/2004 | Liu et al. | ........................ | 717/101 |
| 2005/0246716 A1 * | 11/2005 | Smith et al. | ...................... | 719/315 |
| 2006/0156315 A1 * | 7/2006 | Wood et al. | ................... | 719/328 |
| 2007/0081550 A1 | 4/2007 | Moore | | |
| 2007/0192352 A1 * | 8/2007 | Levy | ............................ | 707/102 |
| 2007/0208711 A1 * | 9/2007 | Rhoads et al. | .................... | 707/3 |
| 2007/0208751 A1 * | 9/2007 | Cowan et al. | ................... | 707/10 |

(Continued)

FOREIGN PATENT DOCUMENTS

| | | |
|---|---|---|
| JP | 2005115569 A | 4/2005 |
| JP | 200648144 A | 2/2006 |

(Continued)

OTHER PUBLICATIONS

Title: Mapping the Space of API Design Decisions , author: J. Stylos et al, source: IEEE, dated: 2007.*

(Continued)

*Primary Examiner* — Chameli Das
(74) *Attorney, Agent, or Firm* — Sughrue Mion, PLLC

(57) ABSTRACT

The present invention provides an open application program interface (API) service. A method of providing the API service includes generating meta-data for executing an API, generating resource data for generating a mash-up of the API, generating description data corresponding to the API, the meta-data, and the resource data, and generating an API package comprising the API, the meta-data, the resource data, and the description data. Accordingly, mash-up contents can be easily generated from various types of APIs.

25 Claims, 8 Drawing Sheets

(56) References Cited

U.S. PATENT DOCUMENTS

| | | | |
|---|---|---|---|
| 2008/0010648 A1* | 1/2008 | Ando et al. | 719/328 |
| 2008/0082974 A1* | 4/2008 | Ellison | 717/170 |
| 2008/0134156 A1* | 6/2008 | Osminer et al. | 717/140 |
| 2008/0208690 A1* | 8/2008 | Lim | 705/14 |
| 2008/0209451 A1* | 8/2008 | Michels et al. | 719/328 |
| 2008/0256561 A1* | 10/2008 | Tang et al. | 719/328 |
| 2009/0007274 A1* | 1/2009 | Martinez et al. | 726/27 |
| 2009/0064090 A1* | 3/2009 | Anonsen et al. | 717/104 |
| 2009/0083058 A1* | 3/2009 | Beringer et al. | 705/1 |
| 2009/0183227 A1* | 7/2009 | Isaacs et al. | 726/1 |
| 2009/0237418 A1* | 9/2009 | Nave et al. | 345/629 |
| 2010/0050118 A1* | 2/2010 | Chowdhury et al. | 715/810 |
| 2010/0211868 A1* | 8/2010 | Karmarkar et al. | 715/234 |
| 2011/0099159 A1* | 4/2011 | Trevor et al. | 707/709 |
| 2011/0161409 A1* | 6/2011 | Nair et al. | 709/203 |

FOREIGN PATENT DOCUMENTS

| | | |
|---|---|---|
| KR | 10-2005-0034824 A | 4/2005 |
| KR | 10-0700626 B1 | 3/2007 |
| WO | WO 2008126796 A1 | 10/2008 |

OTHER PUBLICATIONS

Communication dated Nov. 23, 2011 from the European Patent Office in counterpart European application No. 08861797.2.

Mi-Ji Lee et al., "A study on the Web portal site development Model encouraging Public Participation in Smart Growth Planning Processes by Utilizing Publicity Available GIS Tools." Journal of the Korea Open Geographic Information System Association; Jun. 15, 2007, pp. 430 and 435.

Soo-Jeong Shin et al., "A strategy to introduce Open-API in e-Government." e-Government Focus. Oct. 2007, pp. 21-29.

* cited by examiner

METHOD AND APPARATUS FOR PROVIDING API SERVICE AND MAKING API MASH-UP, AND COMPUTER READABLE RECORDING MEDIUM THEREOF

CROSS-REFERENCE TO RELATED PATENT APPLICATION

This application claims priority from Korean Patent Application No. 10-2007-0131081, filed on Dec. 14, 2007, in the Korean Intellectual Property Office, the disclosure of which is incorporated herein in its entirety by reference.

BACKGROUND OF THE INVENTION

1. Field of the Invention

Method and apparatus consistent with the present invention relate to an open application program interface (API) service, and more particularly, to a method and apparatus for providing an API service and generating an API mash-up, and a computer-readable recording medium having embodied thereon a program for executing the method.

2. Description of the Related Art

A mash-up service is a technology producing a new API by putting two or more APIs together in a web. The mash-up service has advantages in that efforts for realizing a new service are reduced by using an established opened API and in that utility of the established opened API can be maximized.

FIG. 1 is a view of an example of a mash-up service based on an open API.

FIG. 1 illustrates a mash-up 110 in which an imaging service known as Flickr (an online photo management and sharing application), and a map service from Google are combined together. When a user clicks a specific location on a map, the mash-up 110 displays images related to the location on the map. A hypertext markup language (HTML) code 120 of the mash-up 110 is illustrated on the right side of FIG. 1.

FIG. 2 is a flowchart of a method of producing the mash-up of FIG. 1.

Referring to FIG. 2, firstly, a mash-up developer plans to produce a particular kind of mash-up (Operation 202). Then, the mash-up developer searches and selects open APIs (Operation 210) and (Operation 216) that should be used to produce the mash-up (Operation 204). If the mash-up developer decides to produce a mash-up service by using a Google map open API and a Flickr open API, the mash-up developer analyzes the Google map open API and the Flickr open API and grasps characteristics (for example, communication protocol, data format, and input/output data format) of the open API services (Operation 206). An open API service provider generates user account information (Operation 212) and (Operation 218) or a user certification key (Operation 214) and provides them to the mash-up developer.

The mash-up developer secures the open APIs, embodies a mash-up function with reference to manuals provided by open API service providers, and determines a layout of a HTML page to complete final mash-up contents (Operation 208). Accordingly, the mash-up developer should take charge of works related to an embodiment of a mash-up such as a communication protocol and data format conversion. In particular, since a method of providing open API services varies according to the open API service providers, firstly the mash-up developer should analyze various open API services and learn the related technologies, and the mash-up depends on the mash-up developer's ability.

Also, since codes or scripts related to the open APIs consisting of the mash-up are made by the mash-up developer at his or her discretion, it is difficult to renew the open APIs consisting of the mash-up or to add a new open API to the established mash-up.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for providing an application program interface (API) service and producing an API mash-up, and a computer-readable recording medium used to easily produce mash-up contents from various types of APIs.

The present invention also provides a method and apparatus for providing an API service and producing an API mash-up, and a computer-readable recording medium used to easily update mash-up contents comprising various types of APIs.

According to an aspect of the present invention, there is provided a method of providing an application program interface (API) service, the method including: generating meta-data for executing an API; generating resource data for generating a mash-up of the API; generating description data corresponding to the API, the meta-data, and the resource data; and generating an API package comprising the API, the meta-data, the resource data, and the description data.

The API may be an open API or a local API.

The method may further include transmitting the API package to a package providing server or an apparatus for producing the API mash-up.

The meta-data may include information about a communication protocol to communicate with the package providing server or the apparatus for producing the API mash-up, and information about a data format of the API.

The meta-data may further include user account information or a user certification key for using the API.

The resource data may include a configuration data of a user interface to generate the mash-up and a tagging information representing an input/output data format of the API.

The resource data may further include information about an icon or a thumb nail for executing the mash-up of the API in the user interface.

The description data may include information about one of components of the API package, a version of the API, and a library function for executing the API.

According to another aspect of the present invention, there is provided a method of generating an API mash-up, the method including: obtaining at least two API packages which respectively includes an API, meta-data for executing the API, resource data for generating a mash-up of the API, and description data corresponding to the API, the meta-data, and the resource data; extracting the API, the meta-data, and the resource data from each of the at least two API packages by using the description data; and generating a mash-up of the at least two API packages by using the API, the meta-data, and the resource data.

The generating the mash-up of the at least two API packages may include: analyzing an input/output data format of the API; searching another API package to perform the mash-up with the at least two API packages selectively on the basis of the input/output data format of the API; and generating the mash-up by using the at least two API packages and another API package.

The method may further include replacing one of the at least two API packages in the mash-up to another API package.

The method may further include adding another API package to the mash-up.

The method may further include removing a part of the at least two API packages from the mash-up.

According to another aspect of the present invention, there is provided an apparatus for providing an API service, the apparatus including: a meta-data generating unit which generates meta-data for executing an API; a resource data generating unit which generates resource data for generating a mash-up of the API; a description data generating unit which generates description data corresponding to the API, the meta-data, and the resource data; and an API package generating unit which generates an API package comprising the API, the meta-data, the resource data, and the description data.

According to another aspect of the present invention, there is provided an apparatus for producing an API mash-up, the apparatus including: an API package obtaining unit which obtains at least two API packages which respectively comprise an API, meta-data for executing the API, resource data for generating a mash-up of the API, and description data corresponding to the API, the meta-data, and the resource data; a data extracting unit which extracts the API, the meta-data, and the resource data from each of the API packages by using the description data; and a mash-up generating unit which generates a mash-up of the API packages by using the API, the meta-data, and the resource data.

The apparatus may further include a package download unit which downloads the API packages from a service provider or a server of a specified location and a storing unit which stores the downloaded API packages.

The API package obtaining unit may obtain the at least two API packages from the storing unit.

According to another aspect of the present invention, there is provided a computer-readable recording medium having embodied thereon a program for executing a method of providing an API service, the method including: generating meta-data for executing an API; generating resource data for generating a mash-up of the API; generating description data corresponding to the API, the meta-data, and the resource data; and generating an API package comprising the API, the meta-data, the resource data, and the description data.

According to another aspect of the present invention, there is provided a computer-readable recording medium having embodied thereon a program for executing a method of producing an API mash-up, the method including: obtaining at least two API packages which respectively comprise an API, meta-data for executing the API, resource data for generating a mash-up of the API, and description data corresponding to the API, the meta-data, and the resource data; extracting the API, the meta-data, and the resource data from each of the at least two API packages by using the description data; and generating a mash-up of the at least two API packages by using the API, the meta-data, and the resource data.

According to another aspect of the present invention, there is provided a method of generating an Application Program Interface (API) mash-up, the method includes obtaining at least two API packages, extracting data from each of the at least two API packages and generating a mash-up of the at least two API packages by using the extracted data.

The extracted data may include an API, meta-data for executing the API, resource data for generating a mash-up of the API, and description data corresponding to the API, the meta-data, and the resource data.

Each of the at least two API packages may include an API, meta-data, resource data, and description data corresponding to the API, the meta-data, and the resource data.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the appended drawings.

Figure 1:
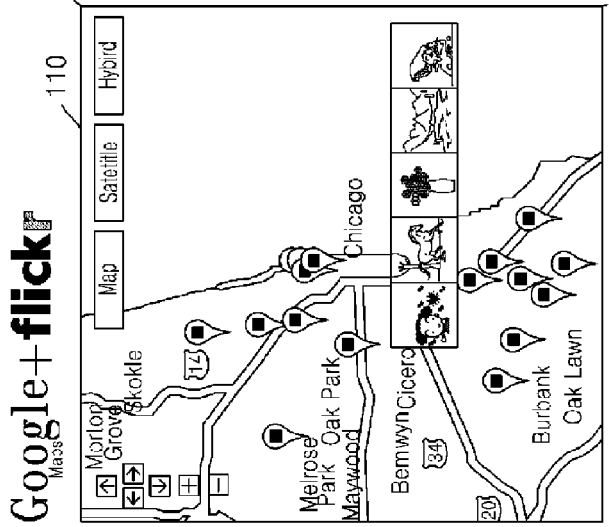
FIG. 1 is a view of an example of a mash-up service based on an open application program interface (API)
Figure 2:
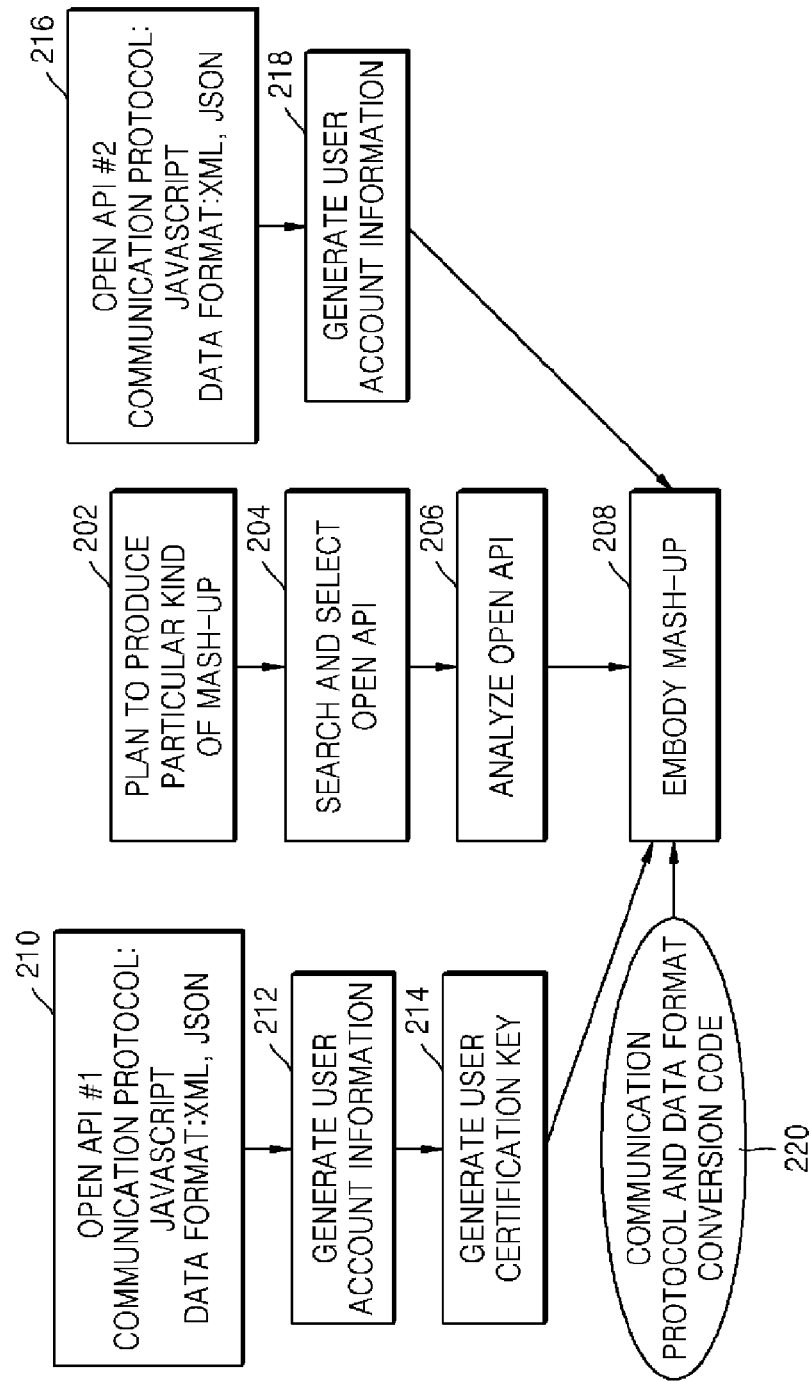
FIG. 2 is a flowchart of a method of producing the mash-up of FIG. 1.
Figure 3:
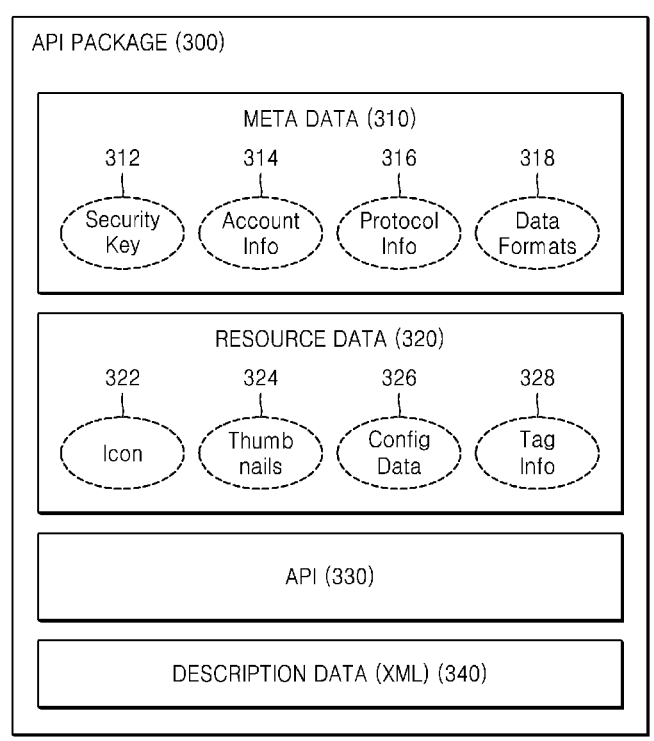
FIG. 3 is a view of an example of an API package according to an exemplary embodiment of the present invention.

FIG. 3 is a view of an example of an application program interface (API) package according to an exemplary embodiment of the present invention.

Referring to FIG. 3, an API package 300 according to an exemplary embodiment the present invention includes meta-data 310, resource data 320, an API 330, and description data 340. The API package 300, which provides API services to an apparatus for producing an API mash-up, is used to provide information related to an API necessary to produce the mash-up in a standardized format.

The meta-data 310 includes information necessary to execute the API 330. The meta-data 310 includes communication protocol information 316 used to send data to an API service provider and receive data from the API service provider, as a representative example, and data format information 318 used to input and output data of the API 330. The API service provider transmits its own API to the apparatus for producing the API mash-up to be described later through a package providing server or transmits it directly. Accordingly, the meta-data 310 should include the communication protocol information 316 and the data format information 318 that are transmitted to/from the package providing server or the apparatus for producing the API mash-up. The communication protocol may be JavaScript, representational state transfer (REST), simple object access protocol (SOAP), and the like, and the data format may be XML, JSON, PHP, or the like.

The meta-data 310 may further include additional information such as user account information 314 or a user certification key 312 used to provide API services that are specialized according to users so that a mash-up developer can use the API.

The resource data 320 is used to produce a mash-up of the API 330. For example, the resource data 320 can be used to provide a user interface for producing the mash-up. The resource data 320 includes configuration data 326 of the user interface or tagging information 328 representing input/output data format of the API 330.

For example, the configuration data 326 includes information about a language, a resolution, a zoom, and the like that are applied to the user interface.

The tagging information 328 represents input/output data format of the API 330. For example, if the mash-up developer uses a Google map open API, the input data format and the output data format may be respectively a specified location and a set of coordinates. On the other hand, if the mash-up developer uses a Flickr open API, the input data format and the output data format may be respectively the name of a place and an image.

Therefore, in the case of the Google map open API, the tagging information 328 can be defined in a standardized format, for example, "input=location" and "output=coordinates". This is for defining pairs of an input and output of the API with tags, because functions of each API are different. Also, a plurality of pieces of tagging information 328 can be input.

The resource data 320 may include information about icons or thumb nails for executing a mash-up of the corresponding API in a user interface for producing a mash-up.

The API 330, which is an entity of an API service, includes exemplary embodiments for substituting for arbitrary codes or scripts produced by the mash-up developer. The API 330 may be specialized according to development languages such as C or Java and may take the form of an API wrapper based on an extensible markup language (XML).

However, the API 330 may not only be an open API but also a local API. The local API is not allowed to be used by anybody as is the case with the open API, and is only allowed to be used by a special apparatus or a special person. For example, the local API is allowed to be used in a cellular phone of "A" brand, and the mash-up developer (that is, a user of the cellular phone) can produce the mash-up by putting the local API and the open API together or by putting the local API and another local API together. In other words, the local API, which is a peculiar API package included in an apparatus, may be installed inside the apparatus as a standardized package at the time of apparatus development.

The description data 340 includes detailed information about the API 330, the meta-data 310, and the resource data 320. An apparatus for producing an API mash-up to be described later can obtain detailed information about the API package 300 through the description data 340. For example, the description data 340 may include components of the API 330, a version of the API 330, a library function necessary to execute the API 330, and details about the meta-data 310 or the resource data 320, etc. For example, the description data 340 may be generated by an XML.

The above-described API package 300 is generated by an API service provider and can be transmitted to the apparatus for producing the API mash-up through the package providing server or can be transmitted directly.

Figure 4:
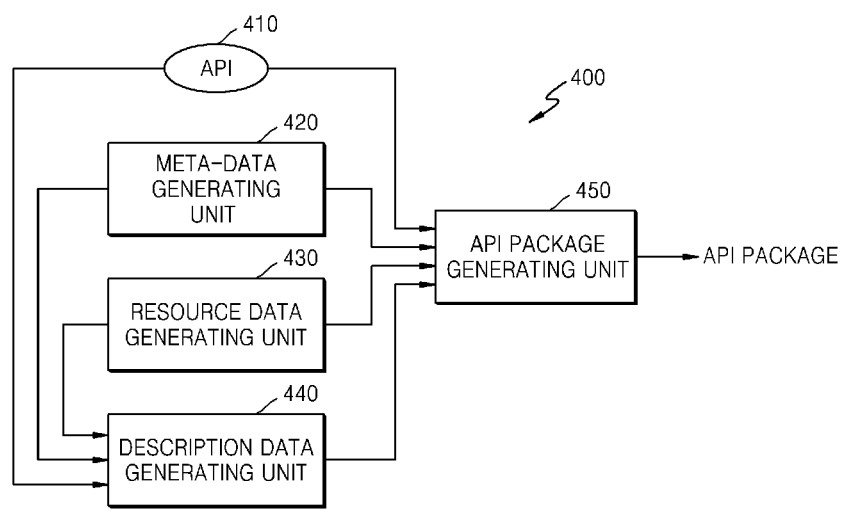
FIG. 4 is a block diagram illustrating an apparatus for providing an API service according to an exemplary embodiment of the present invention.

FIG. 4 is a block diagram illustrating an apparatus for providing an API service 400 according to an exemplary embodiment of the present invention.

Referring to FIG. 4, the apparatus for providing the API service 400 includes a meta-data generating unit 420, a resource data generating unit 430, a description data generating unit 440, and an API package generating unit 450.

The apparatus for providing the API service 400 generates and provides the API package described in FIG. 3.

The meta-data generating unit 420 generates meta-data for executing the API 410. The meta-data includes information necessary to execute the API 410. The meta-data is transmitted to the API package generating unit 450.

The resource data generating unit 430 generates resource data for generating a mash-up of the API 410. The resource data is transmitted to the API package generating unit 450.

The description data generating unit 440 generates description data including detailed information about the meta-data transmitted from the API 410 and the meta-data generating unit 420, and about the resource data transmitted from the resource data generating unit 430.

The API package generating unit 450 inputs the meta-data that is outputted from the API 410 and the meta-data generating unit 420, the resource data that is outputted from the resource data generating unit 430, and the description data that is outputted from the description data generating unit 440, and generates and outputs an API package including those items of data.

Figure 5:
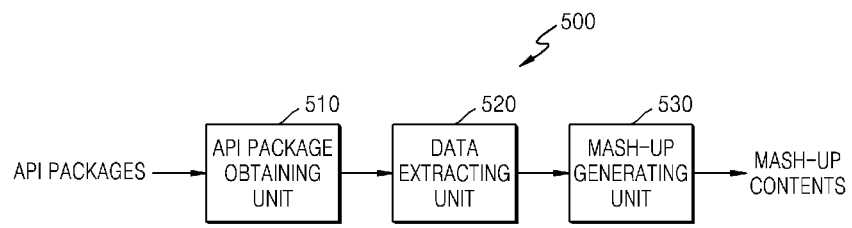
FIG. 5 is a block diagram illustrating an apparatus for producing an API mash-up according to an exemplary embodiment of the present invention.

FIG. 5 is a block diagram illustrating an apparatus for producing an API mash-up 500 according to an exemplary embodiment of the present invention.

Referring to FIG. 5, the apparatus for producing the API mash-up 500 includes an API package obtaining unit 510, a data extracting unit 520, and a mash-up generating unit 530.

The apparatus for producing the API mash-up 500 generates a mash-up using the API package received directly or through a package providing server from the apparatus for providing the API service 400 of FIG. 4.

The API package obtaining unit 510 obtains a plurality of API packages received directly or through the package providing server from the apparatus for providing the API service 400 of FIG. 4. For example, if the API package obtaining unit 510 obtains a map service of Google, an image sharing service of Yahoo, and a third service of a third subject, the API package obtaining unit 510 can receive a standardized API package provided by each service provider through a specified package providing server or can directly receive the standardized API package provided by each service provider from the apparatus for providing the API service.

As described above, each of the API packages includes an API, meta-data, resource data, and description data.

The data extracting unit 520 extracts the API, the meta-data, and the resource data from each of the API packages by using information included in the description data.

The mash-up generating unit 530 generates a mash-up of the API packages by using the API, the meta-data, and the resource data. Since information necessary to generate the mash-up is included in the meta-data, the mash-up generating unit 530 can use the information.

The mash-up generating unit 530 can determine an input/output data format between API services and can determine a method of communicating with a server, by using information about the provided communication protocol or data format.

The mash-up generating unit 530 realizes a user interface by using the resource data and reflects the API package in mash-up contents according to directions input from a user, on the basis of the user interface, so that different user interfaces can be produced for one mash-up. The mash-up generating unit 530 can have the same effect as a process in which a developer adds codes on the basis of the user interface and can reflect necessary information from the resource data and the API.

Figure 6:
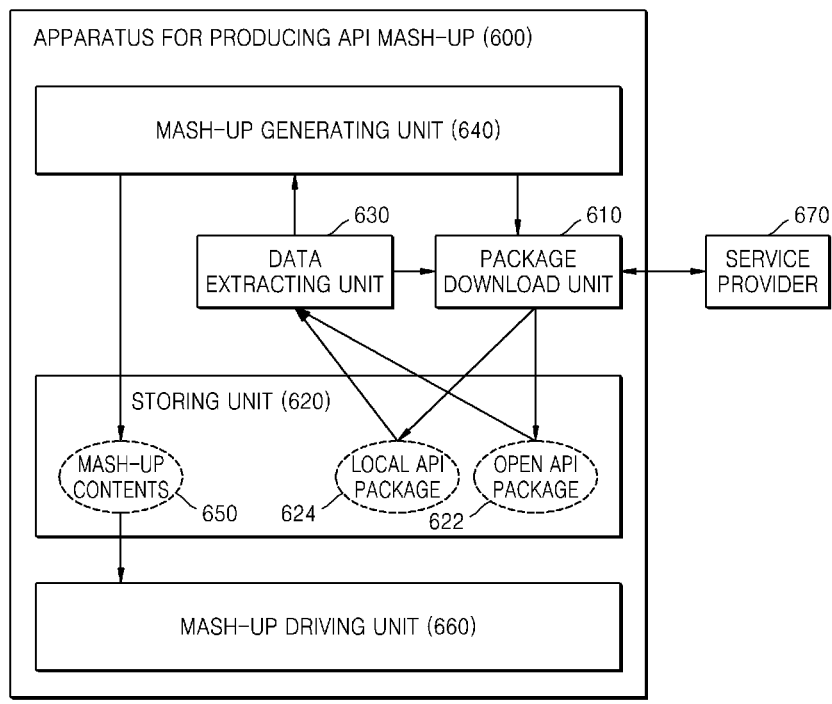
FIG. 6 is a view illustrating an apparatus for producing an API mash-up according to another exemplary embodiment of the present invention.

FIG. 6 is a view illustrating an apparatus for producing an API mash-up 600 according to another exemplary embodiment of the present invention.

FIG. 6 illustrates the apparatus for producing the API mash-up 600 having a more detailed configuration than the apparatus for producing the API mash-up 500 of FIG. 5.

A package download unit 610 downloads an API package from a service provider 670 (or a server of a specified location) according to a request of a mash-up generating unit 640.

A storing unit 620 stores API packages (that is, an open API package 622 and a local API package 624) downloaded by the package download unit 610 from a service provider 670. Also, the storing unit 620 stores mash-up contents 650 generated by the mash-up generating unit 640.

A data extracting unit 630 extracts API, meta-data, resource data, and description data from the API package. Each of the extracted data is transmitted to the mash-up generating unit 640.

The mash-up generating unit 640 generates mash-ups of the API packages by using the API, the meta-data, and the resource data. When another API package is required besides the API packages downloaded from the package download unit 610 in order to generate the mash-up, the mash-up generating unit 640 requests the package download unit 610 to download the corresponding API package. An example of the case in which another API package is required will be described later.

A mash-up driving unit 660 drives the mash-up contents 650 stored in the storing unit 620.

Figure 7:
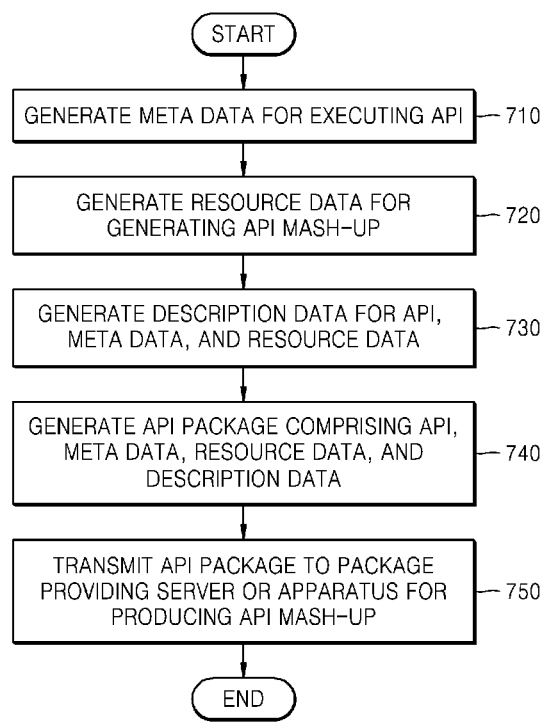
FIG. 7 is a flowchart of a method of providing an API service according to an exemplary embodiment of the present invention.

FIG. 7 is a flowchart of a method of providing an API service according to an exemplary embodiment of the present invention.

Referring to FIG. 7, an apparatus for providing an API service generates meta-data for executing an API (Operation 710). The API may be an open API or a local API. The meta-data includes information about a communication protocol to communicate with a package providing server or an apparatus for producing the API mash-up and information about a data format of the API. The meta-data may further include user account information or a user certification key for using the API.

The apparatus for providing the API service generates resource data for generating a mash-up of the API (Operation 720). The resource data comprises a configuration data of a user interface to generate the mash-up and a tagging information representing an input/output data format of the API The resource data may further include information about an icon or a thumb nail for executing a mash-up of an API in the user interface.

The apparatus for providing the API service generates description data regarding the API, the meta-data, and the resource data (Operation 730). For example, the description data may include information about components of an API package, a version of the API, or a library function for executing the API.

The apparatus for providing the API service generates an API package comprising the API, the meta-data, the resource data, and the description data (Operation 740).

The apparatus for providing the API service transmits the API package to a package providing server or an apparatus for producing the API mash-up (Operation 750).

Figure 8:
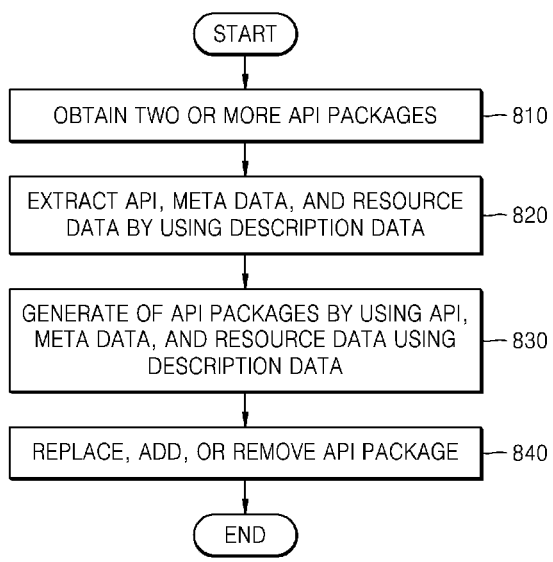
FIG. 8 is a flowchart of a method of producing an API mash-up according to an exemplary embodiment of the present invention.

FIG. 8 is a flowchart of a method of producing an API mash-up according to an exemplary embodiment of the present invention.

Referring to FIG. 8, an apparatus for producing the API mash-up obtains at least two or more API packages which respectively comprise an API, meta-data, resource data, and description data (Operation 810). The API may be an open API or a local API.

The apparatus for producing the API mash-up can obtain the API packages from a package providing server storing a plurality of API packages provided by a plurality of API packages or can directly receive the API packages from an apparatus for providing an API service.

The meta-data includes information about a communication protocol to communicate with the package providing server or the apparatus for producing the API mash-up and information about a data format of the API. The meta-data may further include user account information or a user certification key for using the API.

The resource data comprises a configuration data of a user interface to generate the mash-up and a tagging information representing an input/output data format of the API. The resource data may further include information about an icon or a thumb nail for executing a mash-up of the API in the user interface.

The description data may include information about components of the API package, a version of the API, or a library function for executing the API.

The apparatus for producing the API mash-up extracts the API, the meta-data, and the resource data from each of the API packages by using the description data (Operation 820).

The apparatus for producing the API mash-up generates a mash-up of the API packages by using the API, the meta-data, and the resource data (Operation 830)

The apparatus for producing the API mash-up may replace one of the API packages in the mash-up with another API package, or may add another API package to the mash-up, or may remove a part of the API packages from the mash-up (Operation 840).

Figure 9:
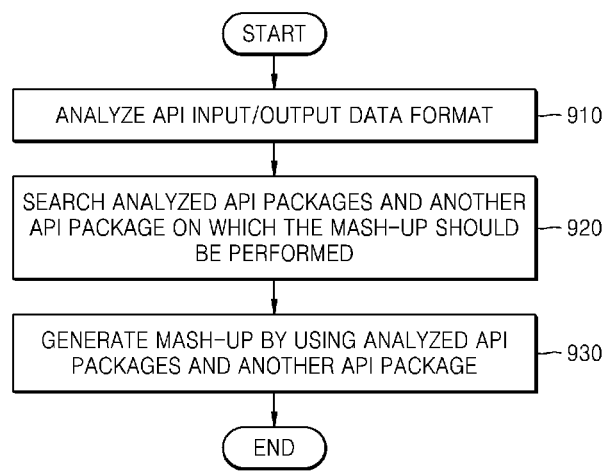
FIG. 9 is a flowchart of an example of a process for producing the mash-up of API packages of FIG. 8.

FIG. 9 is a flowchart of an example of a process for producing a mash-up of API packages as described in relation to FIG. 8.

Referring to FIG. 9, an apparatus for producing the API mash-up analyzes an input/output data format of an API (Operation 910). For example, if a mash-up developer performs a mash-up on a Google map open API and a Flickr open API, the input data format and the output data format of the Google map open API may be a specialized location and coordinates of the map, respectively. Also, the input data format and the output data format of the Flickr open API may be the name of a place and an image, respectively.

For example, the input/output data formats may be analyzed by using data format information of an API and meta-data, or tagging information of resource data.

The apparatus for producing the API mash-up searches another API package to perform the mash-up with the API packages selectively on the basis of the input/output data format of the API (Operation 920). As described above, since the output data format of the Google map open API is a set of coordinates and the input data format of the Flickr open API is the name of a place, the mash-up cannot be performed on the Google map open API and the Flickr open API as it is. Accordingly, the apparatus for producing the API mash-up searches other API packages in which the input data format is a set of coordinates and the output data format is the name of a place. For example, the apparatus for producing the API mash-up can search the corresponding API through the above-described package providing server. Also, the apparatus for producing the API mash-up can search an open API or a local API stored in a storing unit.

The apparatus for producing the API mash-up generates a mash-up by using API packages and another API package (Operation 930).

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and flash memory.

According to the present invention, a standardized format of an API package including an API, meta-data, resource data, and description data is provided and a mash-up is generated using the API package, so that mash-up contents can be easily generated from various types of APIs and can be easily updated.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of providing an Application Program Interface (API) service, the method comprising:
   generating meta-data for executing an API;
   generating resource data for generating a mash-up of the API;
   generating description data corresponding to the API, the meta-data, and the resource data;
   generating an API package comprising the API, the meta-data, the resource data, and the description data; and
   storing the API package in memory,
   wherein the description data comprises information about one of components of the API package, a version of the API, and a library function for executing the API, and
   wherein the generating the API package comprises:
      analyzing an input/output data format of the API;
      searching for another API package to perform the mash-up with the API package selectively on the basis of the input/output data format of the API; and
      generating the mash-up by using the API package and the other API package,
      wherein the analyzing the input/output data format of the API is performed using tagging information of the resource data.

2. The method of claim 1, wherein the API comprises one of an open API and a local API.

3. The method of claim 1, further comprising transmitting the API package to a package providing server or an apparatus for producing the mash-up of the API.

4. The method of claim 3, wherein the meta-data comprises information about a communication protocol to communicate with the package providing server or the apparatus for producing the mash-up of the API, and information about a data format of the API.

5. The method of claim 4, wherein the meta-data further comprises at least one of user account information and a user certification key for using the API.

6. The method of claim 1, wherein the resource data comprises a configuration data of a user interface to generate the mash-up and a tagging information representing the input/output data format of the API.

7. The method of claim 6, wherein the resource data further comprises information about an icon or a thumb nail for executing the mash-up of the API in the user interface.

8. The method of claim 1, wherein the description data further comprises details about the meta-data and the resource data.

9. A method of generating an Application Program Interface (API) mash-up, the method comprising:
   obtaining at least two API packages which respectively comprise an API, meta-data for executing the API, resource data for generating a mash-up of the API, and description data corresponding to the API, the meta-data, and the resource data;
   extracting the API, the meta-data, and the resource data from each of the at least two API packages by using the description data;
   generating a mash-up of the at least two API packages by using the API, the meta-data, and the resource data; and
   storing the mash-up of the at least two API packages in memory,
   wherein the description data comprises information about one of components of the API package, a version of the API, and a library function for executing the API, and
   wherein the generating the mash-up of the at least two API packages comprises:
   analyzing an input/output data format of the API;
   searching for another API package to perform the mash-up with an API
   package selectively on the basis of the input/output data format of the API;
   and
   generating the mash-up by using the API package and the other API package,
   wherein the analyzing the input/output data format of the API is performed using tagging information of the resource data.

10. The method of claim 9, wherein the API comprises one of an open API and a local API.

11. The method of claim 9, wherein the obtaining of the API packages comprises:
   receiving the at least two API packages from a package providing server or an apparatus for providing an API service.

12. The method of claim 11, wherein the meta-data comprises information about a communication protocol to communicate with the package providing server or the apparatus for producing the API mash-up and information about a data format of the API.

13. The method of claim 12, wherein the meta-data further comprises at least one of user account information and a user certification key for using the API.

14. The method of claim 9, wherein the resource data comprises a configuration data of a user interface to generate the mash-up and a tagging information representing the input/output data format of the API.

15. The method of claim 9, wherein the resource data further comprises information about an icon or a thumb nail for executing the mash-up of the API in the user interface.

16. The method of claim 9, further comprising:
   replacing one of the at least two API packages in the mash-up with another API package.

17. The method of claim 9, further comprising:
   adding another API package to the mash-up.

18. The method of claim 9, further comprising:
   removing a part of the API packages from the mash-up.

19. An apparatus for providing an Application Programming Interface (API) service, the apparatus comprising:

a meta-data generating unit which generates meta-data for executing an API;
a resource data generating unit which generates resource data for generating a mash-up of the API;
a description data generating unit which generates description data corresponding to the API, the meta-data, and the resource data; and
an API package generating unit which generates an API package comprising the API, the meta-data, the resource data, and the description data,
wherein the description data comprises information about one of components of the API package, a version of the API, and a library function for executing the API,
wherein the API package generating unit analyzes an input/output data format of the API, searches for another API package to perform the mash-up with the API package selectively on the basis of the input/output data format of the API, and generates the mash-up by using the API package and the other API package,
wherein the API package generating unit analyzes an input/output data format of the API by using tagging information of the resource data, and
wherein a processor configures at least one of the meta-data generating unit, the resource data generating unit, the description data generating unit, and the API package generating unit.

20. An apparatus for producing an Application Programming Interface (API) mash-up, the apparatus comprising:
an API package obtaining unit which obtains at least two API packages which respectively comprise an API, meta-data for executing the API, resource data for generating a mash-up of the API, and description data corresponding to the API, the meta-data, and the resource data;
a data extracting unit which extracts the API, the meta-data, and the resource data from each of the API packages by using the description data; and
a mash-up generating unit which generates a mash-up of the API packages by using the API, the meta-data, and the resource data,
wherein the description data comprises information about one of components of the API package, a version of the API, and a library function for executing the API,
wherein the mash-up generating unit analyzes an input/output data format of the API, searches for another API package to perform the mash-up of the API packages selectively on the basis of the input/output data format of the API, and generates the mash-up by using the API package and the other API package,
wherein the mash-up generating unit analyzes an input/output data format of the API by using tagging information of the resource data, and
wherein a processor configures at least one of the API package obtaining unit, the data extracting unit, and the mash-up generating unit.

21. The apparatus for producing an API mash-up according to claim 20, the apparatus further comprising:
a package download unit which downloads the API packages from a service provider or a server of a specified location; and
a storing unit which stores the downloaded API packages, wherein
the API package obtaining unit obtains the at least two API packages from the storing unit.

22. A non-transitory computer-readable recording medium having embodied thereon a program for executing a method of providing an Application Programming Interface (API) service, the method comprising:
generating meta-data for executing an API;
generating resource data for generating a mash-up of the API;
generating description data corresponding to the API, the meta-data, and the resource data; and
generating an API package comprising the API, the meta-data, the resource data, and the description data,
wherein the description data comprises information about one of components of the API package, a version of the API, and a library function for executing the API, and
wherein the generating the API package comprises:
analyzing an input/output data format of the API;
searching for another API package to perform the mash-up with the API package selectively on the basis of the input/output data format of the API; and
generating the mash-up by using the API package and the other API package,
wherein the analyzing the input/output data format of the API is performed using tagging information of the resource data.

23. A non-transitory computer-readable recording medium having embodied thereon a program for executing a method of producing an Application Programming Interface (API) mash-up, the method comprising:
obtaining at least two API packages which respectively comprises an API, meta-data for executing the API, resource data for generating a mash-up of the API, and description data corresponding to the API, the meta-data, and the resource data;
extracting the API, the meta-data, and the resource data from each of the at least two API packages by using the description data; and
generating a mash-up of the at least two API packages by using the API, the meta-data, and the resource data,
wherein the description data comprises information about one of components of the API package, a version of the API, and a library function for executing the API, and
wherein the generating the mash-up of the at least two API packages comprises:
analyzing an input/output data format of the API;
searching for another API package to perform the mash-up with an API package selectively on the basis of the input/output data format of the API; and
generating the mash-up by using the API package and the other API package,
wherein the analyzing the input/output data format of the API is performed using tagging information of the resource data.

24. A method of generating an Application Program Interface (API) mash-up, the method comprising:
obtaining at least two API packages;
extracting data from each of the at least two API packages;
generating a mash-up of the at least two API packages by using the extracted data; and
storing the at least two API packages in memory,
wherein the at least two API packages respectively comprise an API, meta-data for executing the API, resource data for generating a mash-up of the API, and description data corresponding to the API, the meta-data, and the resource data,
wherein the description data comprises information about one of components of the API package, a version of the API, and a library function for executing the API, and
wherein the generating the mash-up of the at least two API packages comprises:

analyzing an input/output data format of the API;
searching for another API package to perform the mash-up with an API package selectively on the basis of the input/output data format of the API; and
generating the mash-up by using the API package and the other API package,
wherein the analyzing the input/output data format of the API is performed using tagging information of the resource data.

25. The method of generating an Application Program Interface mash-up according to claim 24, wherein the extracted data comprise an API, meta-data for executing the API, resource data for generating a mash-up of the API, and wherein the description data corresponds to the API, the meta-data, and the resource data.

* * * * *